(12) United States Patent
Breidenbach

(10) Patent No.: US 11,071,931 B1
(45) Date of Patent: Jul. 27, 2021

(54) SELF-CLEANING INLINE FILTER

(71) Applicant: UNITED LAUNCH ALLIANCE, L.L.C., Centennial, CO (US)

(72) Inventor: Jay J. Breidenbach, Littleton, CO (US)

(73) Assignee: United Launch Alliance, L.L.C., Centennial, CO (US)

( * ) Notice: Subject to any disclaimer, the term of this patent is extended or adjusted under 35 U.S.C. 154(b) by 390 days.

(21) Appl. No.: 16/235,780

(22) Filed: Dec. 28, 2018

(51) Int. Cl.
*B01D 29/60* (2006.01)
*B01D 29/11* (2006.01)
*B01D 29/50* (2006.01)
*B01D 29/66* (2006.01)

(52) U.S. Cl.
CPC .......... *B01D 29/606* (2013.01); *B01D 29/117* (2013.01); *B01D 29/50* (2013.01); *B01D 29/66* (2013.01)

(58) Field of Classification Search
CPC ...... B01D 29/06; B01D 29/117; B01D 29/50; B01D 29/66
See application file for complete search history.

(56) References Cited

U.S. PATENT DOCUMENTS

| | | | |
|---|---|---|---|
| 3,954,613 A | 5/1976 | Worlidge | |
| 4,042,504 A | 8/1977 | Drori | |
| 4,295,963 A | 10/1981 | Drori | |
| 4,549,961 A | 10/1985 | Bellemann et al. | |
| 4,552,655 A | 11/1985 | Granot | |
| 4,743,365 A | 5/1988 | Noland | |
| 5,560,820 A * | 10/1996 | Consolo | B01D 29/23 210/104 |
| 5,718,822 A | 2/1998 | Richter | |
| 5,772,879 A | 6/1998 | Jaikaran | |
| 6,861,004 B2 | 3/2005 | Benenson, Jr. et al. | |
| 8,529,661 B2 | 9/2013 | Diebold et al. | |
| 9,055,854 B2 | 6/2015 | Jerg et al. | |
| 9,309,841 B2 | 4/2016 | Troxell et al. | |
| 2006/0143853 A1 | 7/2006 | Agerlid et al. | |
| 2015/0053628 A1 | 2/2015 | Dale et al. | |
| 2017/0173504 A1 | 6/2017 | Granot et al. | |

FOREIGN PATENT DOCUMENTS

| | | |
|---|---|---|
| DE | 202010004251 | 9/2011 |
| GB | 2451723 | 2/2009 |

OTHER PUBLICATIONS

"The F450 self-cleaning filter," Georg Schunemann GmbH, 2008, 20 pages [retrieved online from: www.edelflex.com/sites/default/files/filter_F450.pdf].

"GFK Automatic Self-cleaning Filter," AU-LMC, 2016, 3 pages [retrieved online from: www.au-livic.com/gfk-backlush-self-cleaning-filter].

(Continued)

*Primary Examiner* — Dirk R Bass
(74) *Attorney, Agent, or Firm* — Sheridan Ross PC

(57) ABSTRACT

Self-cleaning inline filters that utilize sensors to measure pressure differential and activate a self-cleaning mode are disclosed. In the self-cleaning mode, the self-cleaning inline filters of the present disclosure utilize back, reverse, and/or counter-current fluid flow to separate two filter elements. The back, reverse, and/or counter-current fluid flow also flushes particulates out of the filter, such that the particulates are captured by a mechanical trap.

23 Claims, 2 Drawing Sheets

(56) References Cited

OTHER PUBLICATIONS

"Self Cleaning Inline Filter System with continuous backwash and automatic purge," Rotorflush Filters Ltd, 2018, 10 pages [retrieved online from: www.rotorflush.com/products/self-cleaning-inline-filter/].

"Self Cleaning Filters for Liquids," Russell Finex Ltd., 2018, 7 pages [retrieved online from: www.russellfinex.com/en/separation-equipment/self-cleaning-filters/].

* cited by examiner

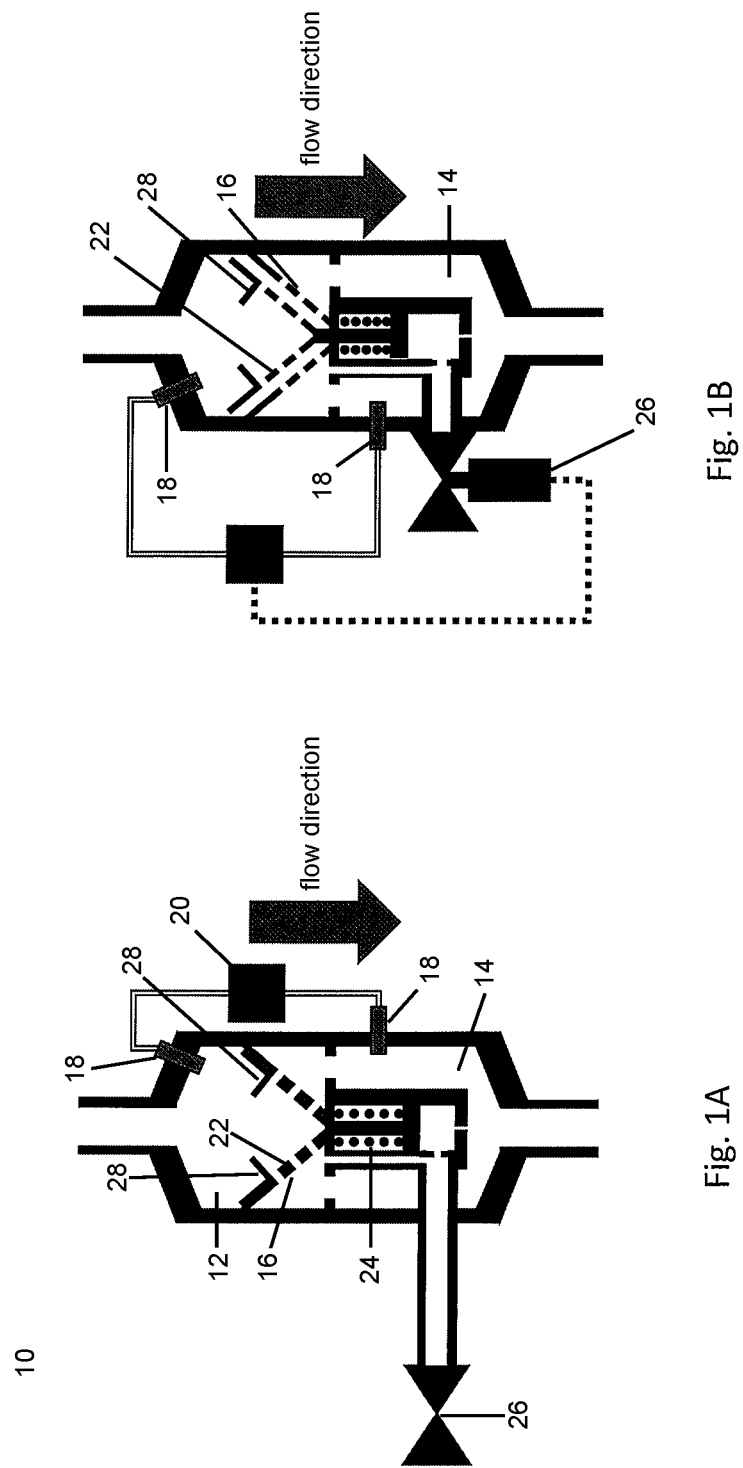

SELF-CLEANING INLINE FILTER

FIELD OF THE INVENTION

The present invention relates generally to self-cleaning inline filters, and particularly to self-cleaning inline filters that utilize back, reverse, and/or counter-current fluid flow to separate two filter elements and/or flush particulates out of the filter and into a mechanical trap.

BACKGROUND OF THE INVENTION

Filters for removing foreign particles from water or other fluids are very common and are employed in a wide variety of applications, generally to prevent clogging or fouling of other devices in fluid communication with the filter. In many applications, it is advantageous for the filter to be capable of cleaning itself periodically, as required, without disrupting the flow of fluid to or through the filter. One known self-cleaning method for filters is by reverse flushing, whereby the filter includes a cleaning nozzle or similar device that sweeps along and cleans an upstream side of the filter by producing a reverse flow of fluid through the filter. In such arrangements, the filter is typically provided with a means for effecting movement of the cleaning nozzle relative to the filter body during the reverse flushing of the filter, to enable the cleaning nozzle to clean the entire surface of the filter body. These arrangements are often complicated and expensive to produce and to maintain.

Another known arrangement for self-cleaning filters provides a plurality of filters with various valve control arrangements, such that a first subset of filters is used during normal filtering operations but, upon accumulation of foreign material within the plurality of filters, the valve controls redirect the fluid to flow through a separate second subset of filters while the filters of the first subset are flushed by reverse flow. Such arrangements also tend to be complicated and expensive.

There is thus a need in the art for self-cleaning filters whose self-cleaning mechanisms and methods are simple and inexpensive to produce and maintain.

SUMMARY OF THE INVENTION

It is one aspect of the present invention to provide a filter assembly, reconfigurable between a normal state and an activated state, comprising a filter body, comprising an upper chamber, configured to receive a first fluid; a lower chamber, configured to receive the first fluid from the upper chamber and dispense the first fluid out of the filter body; a static filter, separating the upper chamber and the lower chamber; a movable filter, repositionable between a first position and a second position; and at least one debris trap; and a pressure source, configured to selectively introduce a second fluid, which may or may not comprise the same compound, mixture, or solution as the first fluid, into the lower chamber, and thereby cause the second fluid to flow through the filter body counter-currently relative to the first fluid, when the filter assembly is in the activated state, wherein, when the movable filter is in the first position, the movable filter aligns with and overlies the static filter to allow the first fluid to pass through both the movable filter and the static filter, wherein, when the filter assembly is reconfigured from the normal state into the activated state, the counter-current flow of the second fluid causes the movable filter to move from the first position to the second position and further causes at least a portion of any debris present in at least one of the static filter and the movable filter to be dislodged, and wherein the at least one debris trap is configured to receive at least a portion of the dislodged debris.

In embodiments, the filter body may further comprise a vent associated with the upper chamber, and the vent may be configured to withdraw at least a portion of the second fluid from the filter body when the filter assembly is in the activated state. The filter assembly may further comprise a negative pressure means associated with the vent, and the negative pressure means may be configured to selectively apply negative pressure to withdraw at least a portion of the second fluid from the filter body when the filter assembly is in the activated state.

In embodiments, the filter body may further comprise at least one pressure sensor associated with at least one of the upper chamber and the lower chamber. The filter body may comprise a pressure sensor associated with the upper chamber and a pressure sensor associated with the lower chamber. The filter assembly may further comprise a controller configured to receive pressure data from the pressure sensors. The controller may be configured to provide at least one of a visual output and an auditory output when a difference between a pressure measured by the pressure sensor associated with the upper chamber and a pressure measured by the pressure sensor associated with the lower chamber exceeds a predetermined threshold, and/or the controller may be configured to automatically reconfigure the filter assembly from the normal state to the activated state when a difference between a pressure measured by the pressure sensor associated with the upper chamber and a pressure measured by the pressure sensor associated with the lower chamber exceeds a predetermined threshold. The controller may be configured to automatically reconfigure the filter assembly from the activated state to the normal state when the difference no longer exceeds the predetermined threshold.

In embodiments, the filter body may further comprise biasing means, such as a spring, configured to bias the movable filter into the first position in the absence of the counter-current flow of the second fluid.

It is another aspect of the present invention to provide a method for cleaning an inline filter, comprising (a) providing a filter body, comprising an upper chamber, a lower chamber, a static filter separating the upper chamber and the lower chamber, a movable filter, and at least one debris trap, wherein the movable filter occupies a first position in which the movable filter aligns with and overlies the static filter; (b) continually flowing a first fluid through the filter body such that the first fluid enters the filter body via the upper chamber, passes through both the movable filter and the static filter and into the lower chamber, and exits the filter body via the lower chamber; and (c) introducing a second fluid into the lower chamber of the filter body such that the second fluid flows through the filter body counter-currently relative to the first fluid, wherein the counter-current flow of the second fluid in step (c) causes the movable filter to move from the first position into a second position and further causes at least a portion of any debris present in at least one of the static filter and the movable filter to be dislodged, and wherein the at least one debris trap is configured to receive at least a portion of the dislodged debris.

In embodiments, the filter body may further comprise a vent associated with the upper chamber, and the method may further comprise withdrawing at least a portion of the second fluid from the filter body via the vent. The withdrawing step may comprise applying negative pressure to the upper chamber via the vent.

In embodiments, the filter body may further comprise at least one pressure sensor associated with at least one of the upper chamber and the lower chamber. The filter body may comprise a pressure sensor associated with the upper chamber and a pressure sensor associated with the lower chamber. The method may further comprise providing a controller configured to receive pressure data from the pressure sensors. The controller may be configured to provide at least one of a visual output and an auditory output when a difference between a pressure measured by the pressure sensor associated with the upper chamber and a pressure measured by the pressure sensor associated with the lower chamber exceeds a predetermined threshold, and/or the controller may be configured to automatically perform step (c) when a difference between a pressure measured by the pressure sensor associated with the upper chamber and a pressure measured by the pressure sensor associated with the lower chamber exceeds a predetermined threshold. The method may further comprise ceasing introduction of the second fluid, and the controller may be configured to automatically perform the ceasing step when the difference no longer exceeds the predetermined threshold.

In embodiments, the filter body may further comprise biasing means, for example, a spring, configured to bias the movable filter into the first position in the absence of the counter-current flow of the second fluid.

The Summary of the Invention is neither intended nor should it be construed as being representative of the full extent and scope of the present invention. Moreover, reference made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, explain the principles of these inventions. It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

FIG. 1A illustrates a filter assembly in a normal state, according to a first embodiment of the present invention.

FIG. 1B illustrates a filter assembly in an activated state, according to a first embodiment of the present invention.

DETAILED DESCRIPTION OF THE INVENTION

Figure 2B:
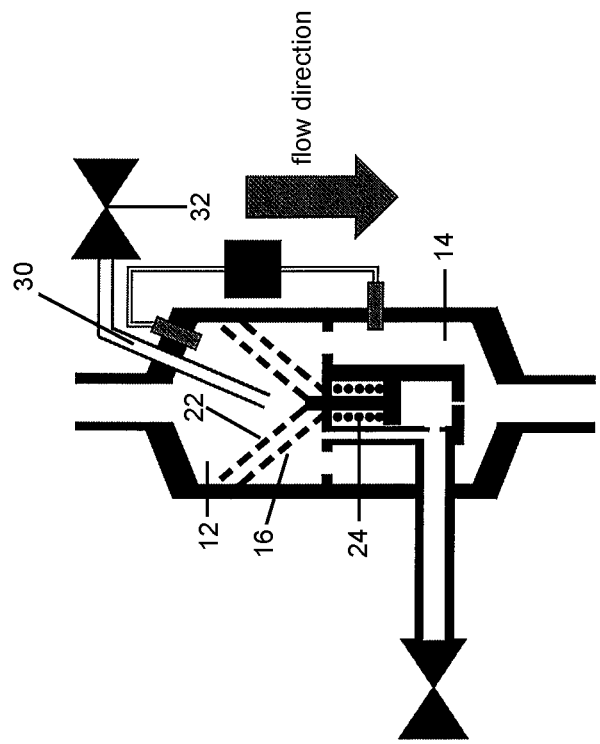
FIG. 2B illustrates a filter assembly in an activated state, according to a second embodiment of the present invention.

To comply with written description and enablement requirements, the following references are incorporated herein for their disclosures of devices and methods that can be employed in various embodiments of the present invention:

U.S. Pat. No. 4,042,504, entitled "Self cleanable filters," issued 16 Aug. 1977 to Drori ("Drori").

U.S. Pat. No. 4,549,961, entitled "Apparatus for cleaning filters in pressurized fluid flow systems," issued 29 Oct. 1985 to Bellemann et al. ("Bellemann").

U.S. Pat. No. 4,552,655, entitled "Self-cleaning filter apparatus," issued 12 Nov. 1985 to Granot ("Granot").

U.S. Pat. No. 4,743,365, entitled "Valve filter mechanism," issued 10 May 1988 to Noland ("Noland").

Referring now to FIGS. 1A and 1B, a first embodiment of an inline filter assembly according to the present invention is illustrated in a normal state (FIG. 1A) and an activated state (FIG. 1B). In this first embodiment, a filter body 10 of the filter assembly includes an upper chamber 12 and a lower chamber 14, separated by a static filter 16. The filter assembly is configured and disposed such that a fluid to be filtered flows through the filter body 10 from top to bottom, i.e. fluid enters the filter body 10 in the upper chamber 12, flows from the upper chamber 12 to the lower chamber 14, and exits the filter body 10 from the lower chamber 14, as shown by the arrow labeled "flow direction." Pressure sensors 18 are associated with each of the upper chamber 12 and the lower chamber 14. A controller 20 is interconnected to both pressure sensors 18 to detect any pressure differential between the upper chamber 12 and the lower chamber 14 as the fluid flows through the filter body 10, where a lower pressure in the lower chamber 14 indicates a clog or obstruction of the filter assembly.

A movable filter or membrane 22 overlies the static filter 16. The movable filter 22 is capable of moving from a first position, corresponding to the normal state of the filter assembly illustrated in FIG. 1A, to a second position, corresponding to the activated state of the filter assembly illustrated in FIG. 1B; a spring 24 biases the movable filter 22 into the first position. In the normal state of the filter assembly illustrated in FIG. 1A, the static filter 16 and the movable filter 22 are aligned to allow fluid to pass through the filter body 10. While the illustrated spring 24 is a coil spring, those of skill in the art, upon review of the present disclosure, will appreciate that other biasing mechanisms, including other spring types, may be utilized to bias the movable filter between the first and second positions and fall within the scope of the present disclosure.

A pressure source 26 communicates with the lower chamber 14 and the movable filter 22, whereby the pressure source 26 may introduce a fluid into the filter body 10 via the lower chamber 14. The fluid introduced by the pressure source 26 flows counter-currently to the fluid being filtered, causing the movable filter 22 to move from the first position to the second position and, thus, reconfiguring the filter assembly from the normal state (FIG. 1A) to the activated state (FIG. 1B). The combination of the movement of the movable filter 22 to the second position and the counter-current pressure of the fluid introduced by the pressure source 26 causes particulates and other debris that may clog or block one or both of the static filter 16 and the movable filter 22 to dislodge; debris traps 28 capture at least a portion of this dislodged debris. With this debris removed from the movable filter, the movable filter can be returned to the normal state, which is accomplished by ceasing introduction of the counter-current fluid via the pressure source 26 and thus causing the movable filter 22 to return to the first position under the influence of the biasing means 24. The controller 20 may (but need not) be configured to provide a visual or auditory indicator to a user to reconfigure the filter assembly into the activated state when a pressure differential between the upper chamber 12 and the lower chamber 14 exceeds a predetermined threshold; additionally and/or alternatively, the controller 20 may (but need not) be configured to automatically reconfigure the filter assembly into the activated state (e.g. by automatically controlling the pressure source 26) when the pressure differential exceeds the predetermined threshold and/or automatically reconfigure the filter assembly into the normal state when the pressure differential no longer exceeds the predetermined threshold. The fluid introduced by the second source 26 may be the same fluid as is flowing through the filter 10 under normal conditions or may be a different fluid compatible with the overall system.

Figure 2A:
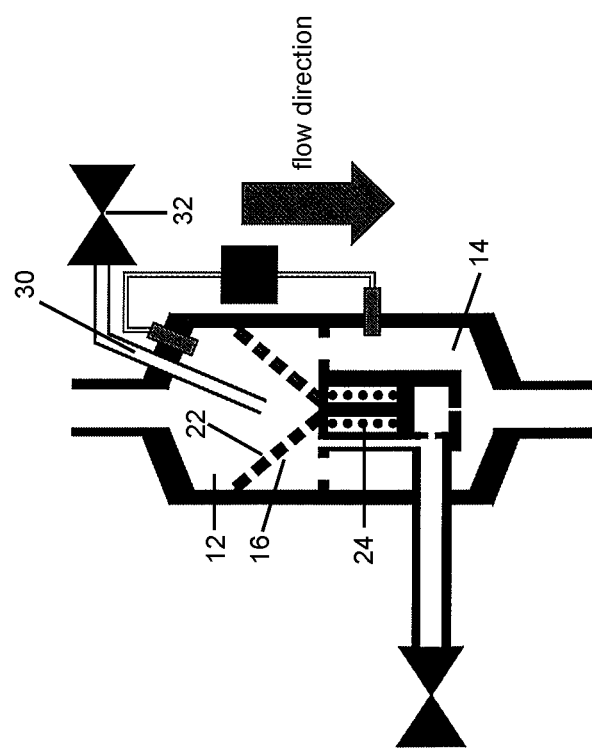
FIG. 2A illustrates a filter assembly in a normal state, according to a second embodiment of the present invention.

Referring now to FIGS. 2A and 2B, a second embodiment of an inline filter assembly according to the present invention is illustrated in a normal state (FIG. 2A) and an activated state (FIG. 2B). This second embodiment is largely similar to the first embodiment illustrated in FIGS. 1A and 1B, except that a vent 30 is provided in association with the upper chamber 12 of the filter body 10. In this second embodiment, the vent 30 may, upon movement of the movable filter 22 from the first position (FIG. 2A) to the second position (FIG. 2B), be activated to withdraw at least a part of the fluid from the upper chamber 12, and/or at least part of the dislodged debris entrained therein. The removed fluid may include one or both of the fluid introduced by the pressure source 26 as well as fluid within the upper chamber 12 due to normal operations of the system. The vent 30 may, but need not, be associated with a pump or other negative pressure means 32 that causes the fluid within the upper chamber 12 to be withdrawn. Once the movable filter 22 returns to the first position (FIG. 2A) from the second position (FIG. 2B) and the filter assembly thus returns to the normal state from the activated state, the vent 30 (and negative pressure means 32, if present) may be deactivated. Fluid withdrawn via the vent 30 may, but need not, be subjected to further filtering operations and/or recycled to a primary flow line to be filtered by the filter assembly. As in the first embodiment, the controller 20 may (but need not) be configured to provide a visual or auditory indicator to a user to reconfigure the filter assembly into the activated state when a pressure differential between the upper chamber 12 and the lower chamber 14 exceeds a predetermined threshold; additionally and/or alternatively, the controller 20 may (but need not) be configured to automatically reconfigure the filter assembly into the activated state (e.g. by automatically controlling the pressure source 26, the vent 30, and/or the negative pressure means 32) when the pressure differential exceeds the predetermined threshold and/or automatically reconfigure the filter assembly into the normal state when the pressure differential no longer exceeds the predetermined threshold.

Although depicted as generally V- or wedge-shaped in the Figures, it is to be understood that the debris trap(s) 28 may have any suitable geometry and degree of porosity for a desired application, and that any number of variants not depicted in the Figures are possible and within the scope of the present disclosure. These characteristics of the debris trap(s) 28 will typically depend upon characteristics of the flow of the fluid flowing through the filter 10 and/or the fluid introduced by the pressure source 26, e.g. flow rate, viscosity, Reynolds number, etc. In some embodiments, and without wishing to be bound by any particular theory, the debris trap(s) 28 may retain debris due to turbulence and/or microeddies created as a result of the counter-current flow of the fluid flowing through the filter 10 and the fluid introduced by the pressure source 26 when the filter 10 is in the activated state.

Similarly, although the filter assembly 10 is depicted as generally cylindrical in the Figures and such a shape may be desirable in some applications as a result of its advantageous load and stress capabilities, it is to be understood that any other suitable cross-section (e.g. triangular, rectangular, n-gonal where n is at least 5, etc.) and/or any other suitable shape (e.g. conical, pyramidal, etc.) is within the scope of the present application. The static filter 16 and movable filter 22, although depicted as generally V-, wedge-, or cone-shaped in the Figures, may likewise have any suitable shape for a particular application, so long as pores in the static filter 16 and movable filter 22 align to allow fluid to pass through the filter body 10 when the filter is in the normal state and create adequate fluid turbulence when the filter is in the activated state.

A maintenance interval of the filter 10 will generally depend upon the typical debris load of the fluid(s) flowing through the filter 10. Monitoring of the pressure differential and cycle rate of the filter 10 can provide feedback to a user indicating that the filter 10 requires cleaning, according to the present invention. The self-cleaning ability of filters according to the present disclosure may extend and/or lengthen the maintenance interval compared to conventional filters; in particular, the embodiment depicted in FIGS. 2A and 2B, comprising a vent 30 and/or negative pressure means 32 for active removal of fluid and/or debris, may significantly reduce the susceptibility of the filter 10 to blockage and extend the maintenance interval.

One advantage of the present invention relative to previous methods and systems for self-cleaning filters is that embodiments of the present invention can be provided using a significantly lesser mass and/or weight of materials. Such an advantage may be particularly desired where manufacturing costs are a concern, and/or where other considerations may dictate that a mass of the filter system should be minimized. Applications in which self-cleaning filter methods and systems of the present invention may be employed include, by way of non-limiting example, filters for various spacecraft systems, as spacecraft launch costs increase with increasing mass and the accessibility of a human user to clean or repair the filter systems in space are often limited.

While various embodiments of the present invention have been described in detail, it is apparent that modifications and alterations of those embodiments will occur to those skilled in the art. However, it is to be expressly understood that such modifications and alterations are within the scope of the present invention, as set forth in the following claims. Other modifications or uses for the present invention will also occur to those of skill in the art after reading the present disclosure. Such modifications or uses are deemed to be within the scope of the present invention.

The invention claimed is:

1. A filter assembly, reconfigurable between a normal state and an activated state, comprising:
   a filter body, comprising:
      an upper chamber, configured to receive a first fluid;
      a lower chamber, configured to receive the first fluid from the upper chamber and dispense the first fluid out of the filter body;
      a static filter, separating the upper chamber and the lower chamber;
      a movable filter, repositionable between a first position and a second position; and
      at least one debris trap; and
   a pressure source, configured to selectively introduce a second fluid into the lower chamber, and thereby cause the second fluid to flow through the filter body counter-currently relative to the first fluid, when the filter assembly is in the activated state,
   wherein, when the movable filter is in the first position, the movable filter aligns with and overlies the static filter to allow the first fluid to pass through both the movable filter and the static filter,
   wherein, when the filter assembly is reconfigured from the normal state into the activated state, the counter-current flow of the second fluid causes the movable filter to move from the first position to the second position and further causes at least a portion of any debris present in at least one of the static filter and the movable filter to be dislodged, and
   wherein the at least one debris trap is configured to receive at least a portion of the dislodged debris.

2. The filter assembly of claim 1, wherein the filter body further comprises a vent associated with the upper chamber, wherein the vent is configured to withdraw at least a portion of the second fluid from the filter body when the filter assembly is in the activated state.

3. The filter assembly of claim 2, further comprising a negative pressure means associated with the vent, wherein the negative pressure means is configured to selectively apply negative pressure to withdraw at least a portion of the second fluid from the filter body when the filter assembly is in the activated state.

4. The filter assembly of claim 1, wherein the filter body further comprises at least one pressure sensor associated with at least one of the upper chamber and the lower chamber.

5. The filter assembly of claim 4, wherein the filter body comprises a pressure sensor associated with the upper chamber and a pressure sensor associated with the lower chamber.

6. The filter assembly of claim 5, further comprising a controller configured to receive pressure data from the pressure sensors.

7. The filter assembly of claim 6, wherein the controller is configured to provide at least one of a visual output and an auditory output when a difference between a pressure measured by the pressure sensor associated with the upper chamber and a pressure measured by the pressure sensor associated with the lower chamber exceeds a predetermined threshold.

8. The filter assembly of claim 6, wherein the controller activates and deactivates the flow of the second fluid.

9. The filter assembly of claim 6, wherein the controller is configured to automatically reconfigure the filter assembly from the normal state to the activated state when a difference between a pressure measured by the pressure sensor associated with the upper chamber and a pressure measured by the pressure sensor associated with the lower chamber exceeds a predetermined threshold.

10. The filter assembly of claim 9, wherein the controller is configured to automatically reconfigure the filter assembly from the activated state to the normal state when the difference no longer exceeds the predetermined threshold.

11. The filter assembly of claim 1, wherein the filter body further comprises a spring configured to bias the movable filter into the first position in the absence of the counter-current flow of the second fluid.

12. The filter assembly of claim 1 wherein the first fluid and the second fluid are the same fluid.

13. A method for cleaning an inline filter, comprising:
   (a) providing a filter body, comprising an upper chamber, a lower chamber, a static filter separating the upper chamber and the lower chamber, a movable filter, and at least one debris trap, wherein the movable filter occupies a first position in which the movable filter aligns with and overlies the static filter;
   (b) continually flowing a first fluid through the filter body such that the first fluid enters the filter body via the upper chamber, passes through both the movable filter and the static filter and into the lower chamber, and exits the filter body via the lower chamber; and
   (c) introducing a second fluid into the lower chamber of the filter body such that the second fluid flows through the filter body counter-currently relative to the first fluid,
   wherein the counter-current flow of the second fluid in step (c) causes the movable filter to move from the first position into a second position and further causes at least a portion of any debris present in at least one of the static filter and the movable filter to be dislodged, and
   wherein the at least one debris trap is configured to receive at least a portion of the dislodged debris.

14. The method of claim 13, wherein the filter body further comprises a vent associated with the upper chamber, further comprising withdrawing at least a portion of the second fluid from the filter body via the vent.

15. The method of claim 14, wherein the withdrawing step comprises applying negative pressure to the upper chamber via the vent.

16. The method of claim 13, wherein the filter body further comprises at least one pressure sensor associated with at least one of the upper chamber and the lower chamber.

17. The method of claim 16, wherein the filter body comprises a pressure sensor associated with the upper chamber and a pressure sensor associated with the lower chamber.

18. The method of claim 17, further comprising providing a controller configured to receive pressure data from the pressure sensors.

19. The method of claim 18, wherein the controller is configured to provide at least one of a visual output and an auditory output when a difference between a pressure measured by the pressure sensor associated with the upper chamber and a pressure measured by the pressure sensor associated with the lower chamber exceeds a predetermined threshold.

20. The method of claim 18, wherein the controller is configured to automatically perform step (c) when a difference between a pressure measured by the pressure sensor associated with the upper chamber and a pressure measured by the pressure sensor associated with the lower chamber exceeds a predetermined threshold.

21. The method of claim 20, further comprising ceasing introduction of the second fluid, wherein the controller is configured to automatically perform the ceasing step when the difference no longer exceeds the predetermined threshold.

22. The method of claim 13, wherein the filter body further comprises biasing means configured to bias the movable filter into the first position in the absence of the counter-current flow of the second fluid.

23. The method of claim 13, wherein the first and second fluids are the same fluid.

\* \* \* \* \*